Feb. 26, 1963 B. J. BREZOSKY ETAL 3,079,094
COMMINUTING MEANS FOR LIQUID SPRAYING SYSTEM OF DISHWASHERS
Filed May 5, 1961 2 Sheets-Sheet 1

INVENTORS
BERNARD J. BREZOSKY
& DONALD S. CUSHING
BY
Richard L. Caslin
THEIR ATTORNEY

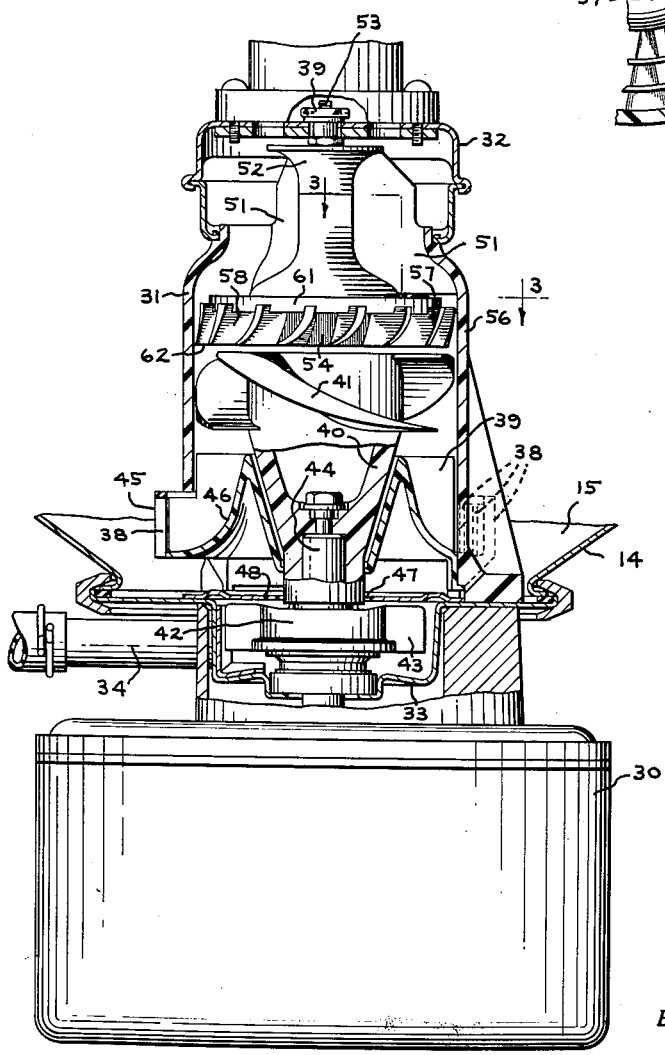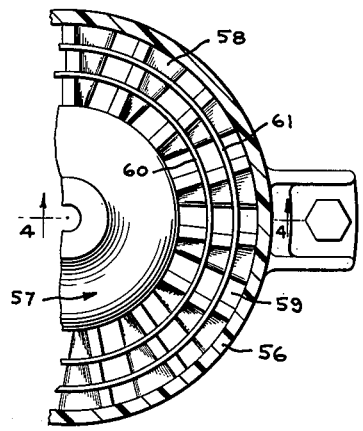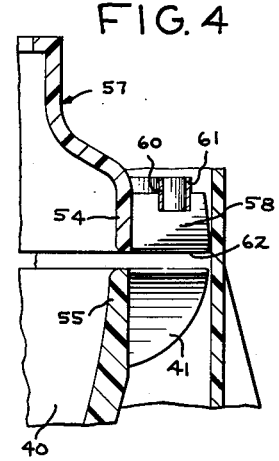

United States Patent Office 3,079,094
Patented Feb. 26, 1963

3,079,094
COMMINUTING MEANS FOR LIQUID SPRAYING SYSTEM OF DISHWASHERS
Bernard J. Brezosky and Donald S. Cushing, Louisville, Ky., assignors to General Electric Company, a corporation of New York
Filed May 5, 1961, Ser. No. 107,988
5 Claims. (Cl. 241—46)

This invention relates to liquid spraying systems for automatic dishwashers and the like, and more particularly to a comminuting means for subdividing gross food waste in the liquid to be sprayed.

Automatic dishwashers of the reaction spray type are generally designed to employ an operating cycle including a series of separate washing and rinsing operations in each of which a comparatively small amount of water is admitted to the washing compartment, circulated therein, and then discharged from the machine. The washing water is generally sprayed upon the dishes in a plurality of spray streams in a spraying system including a rotating spray arm and a pumping mechanism which places a suitable pressure head upon the water being sprayed. Various precautions are taken by the user of the machine to remove food objects of large size from the dishes before placing the same in the machine, but occasionally gross food waste may find its way into the spray system and may clog the spraying orifices. When this occurs, the washing operation may be adversely affected. It is a purpose of the present invention to eliminate the necessity for hand rinsing dishes by the proper design of the pumping mechanism to include a gross food slicing means therein.

A general object of the invention is to provide a comminuting means for the liquid spraying system of dishwashers and by means of which gross food objects are reduced to a size sufficiently small to avoid clogging of orifices in the spraying system.

Another object of this invention is to provide a comminuting and filtering means in the spraying system of a dishwasher at a fixed location downstream of a pump and upstream of a spraying member of the system, and whose presence produces a negligible resistance to flow of liquid in the spraying system.

Further objects and advantages of the invention will become apparent as the description proceeds, and the features of novelty which characterize the invention will be pointed out particularly in the claims annexed to and forming a part of this specification.

In accordance with one aspect of the invention there is provided a rotatable spray arm disposed beneath the lower rack of dishes in the dishwasher and rotatable under the reactive force of liquid discharged from a plurality of orifices in that arm. The liquid is supplied to the spray arm, as well as to any desired additional spray member, from an axial flow pump on whose housing the spray arm is rotatably mounted. A diffuser serving to change the swirling flow of liquid leaving the pump into a generally straight line flow of liquid entering the spray arm, is interposed between the pump and the spray arm. Extending between the vanes of this diffuser are one or more cutting members having sharpened edges serving to subdivide any gross food objects entrained in liquid being pumped.

For a better understanding of the invention, reference now is made to the following description and accompanying drawings in which:

FIG. 2 is an enlarged side elevation view with parts broken away and parts in section of an axial flow pump for the spraying system and with the comminuting means installed upon a diffuser downstream of the pump impeller;

FIG. 3 is a top plan view of a portion of the combined diffuser and comminuting means taken on line 3—3 of FIG. 2; and FIG. 4 is an enlarged fragmentary elevational sectional view taken on line 4—4 of FIG. 3.

Figure 1:
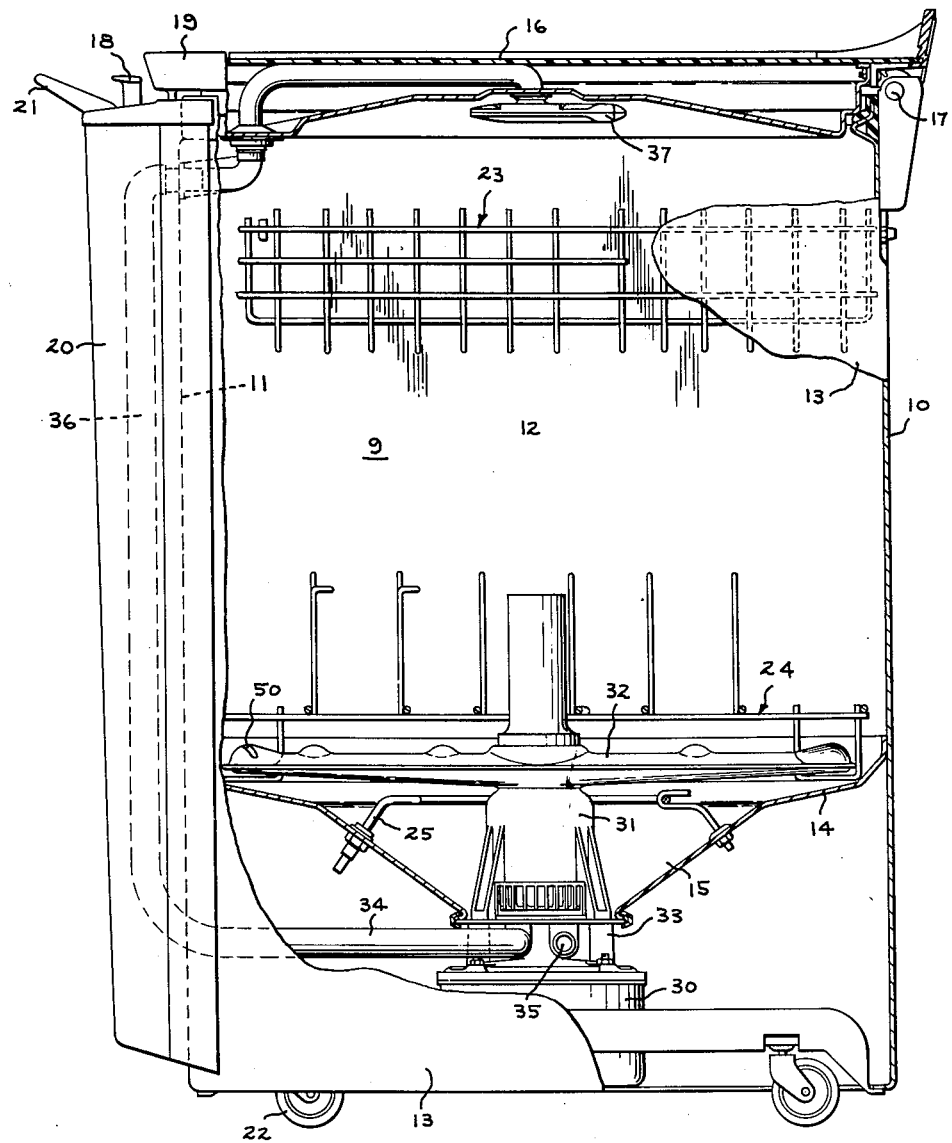
FIG. 1 is a side elevation view with parts broken away and parts in section, of a portable automatic dishwasher with a pumping mechanism incorporating the present invention.

Referring to FIG. 1 of the drawing, there is shown a portable automatic dishwasher comprising a tub 9 defined by side walls 10, 11, 12 and 13 and having a bottom wall 14 sloping downwardly to form a sump space 15 for the collection of washing liquid. The liquid is supplied to the machine by any suitable means, not shown, and which supply forms no part of the present invention. In the type of portable dishwasher as shown, the tub is closed at its top by a cover 16 hinged along its back edge at 17 although the invention, as will be understood, is in no way limited to a tub type dishwasher having this type of access opening. A suitable latch 18 may be provided at the front edge of the access cover for locking the cover in closed position during the operation of the dishwasher, and a cover push plate 19 serves to assist in the opening and closing of the cover. Within the front panel 20 of the cabinet structure the controls of the machine may conveniently be mounted, and a handle 21 for grasping and moving the machine on its casters 22 may likewise be mounted on this front panel.

Disposed within the tub 9 is an upper dish rack 23, and suitably spaced therebelow is a separate dish rack 24. In addition, a heating element 25 may be mounted within the confines of the tub below these racks. A pumping mechanism, as best disclosed in the co-pending application of Albert L. Hardy et al., (Docket 9D-4301), filed concurrently herewith, and assigned to the same assignee as is the present invention, extends through the bottom wall 14 of the tub. In the preferred embodiment the pumping mechanism is mounted to extend through a reversible electric motor 30 for driving an axial flow pump located within the upper pump housing 31 and discharging the washing liquid into the spraying system including a rotatable spray arm 32 having a plurality of small orifices 50. The motor 30 likewise drives a centrifugal drain pump located within the lower pump housing 33 and discharging into either the recirculating spray conduit 34 or the drain conduit 35, depending upon the direction of the motor rotation. Liquid pumped into conduit 34 serves a washing purpose and passes through a riser conduit 36 into a rotatable spray means 37 mounted to spray downwardly upon the dishes in the upper rack 23, as best disclosed in the co-pending application of Russell M. Sasnett, Serial No. 853,894, filed November 18, 1959, now Patent No. 2,987,260 and assigned to the same assignee as is the present invention.

Referring now to FIG. 2, the axial flow pump comprises an impeller 40 having curved vanes 41 thereon for rotation within the confining side walls of the housing 31, and the centrifugal drain pump comprises an impeller 42 having vanes 43 thereon for rotation within the confining side walls of the housing 33. Each of these pumps is driven from a single shaft 44 of the motor, and the axial flow pump has a greater pumping capacity than the centrifugal pump. The axial flow pump, moreover, has a relatively large circular inlet opening 45 represented by a grid-like fence of closely spaced posts 38 which encircle the pump housing and are supported from a pump inlet cover 46. This pump inlet cover serves to guide the stream of liquid entering the pump and straighten out the flow with vertical baffles 39 before the liquid reaches the vanes of the pump impeller 40. The centrifugal drain pump has a smaller inlet opening 47 of annular shape extending through an inlet cover 48 for the housing 33, both of these inlet openings 45 and 47, however, communicating with the same sump space 15.

During circulation of washing liquid, gross food objects accumulate in the sump space 15 and tend to be carried into the larger inlet opening 45 through the vertical posts 38 and it becomes especially important to prevent clogging of the orifices in the spraying system downstream of that axial flow pump because the food particles are difficult to remove once they enter the hollow spray arm 32.

At its top edge the pump housing 31 is reduced in diameter and is recessed to provide a seat on which the hollow spray arm 32 is arranged to rotate under the reactive propulsion force furnished by the discharge of liquid from the orifices 50. Internal arch-like webs, as seen at 51, project from the upper pump housing and support a stationary central boss 52 having a bolt 53 passing therethrough. A flanged nut 39 is threaded onto the bolt to pivot the spray arm to the top of the pump housing. This bolt also serves to secure to the boss 52 a downwardly extending diffuser member 57 with a series of radially extending vanes 58 as well as a generally cylindrical lower wall portion 54 whose diameter is substantially equal to the diameter of the uppermost body portion 55 of the axial flow pump impeller 40, as best seen in FIG. 4. Between these respective portions and the cylindrical inner wall 56 of the upper pump housing 31 an annular outlet space for the liquid under the pressure head of the pump, is provided.

Such liquid moving under the influence of the rotating vanes 41 has a swirling motion with appreciable velocity, but as it strikes the series of radially extending stationary vanes 57 of the diffuser its motion is converted into a generally axial direction with respect to the pump impeller. The diffuser 57 is provided with a relatively large number of curved vanes 58, as contrasted with the vanes 41 carried by that pump impeller, and these diffuser vanes are separated by relatively small spaces 59 through which the liquid moves at high velocity. The purpose of the vanes 58 is to again straighten out the flow of liquid and prevent it from swirling as it leaves the discharge end of the pump impeller 40. These vanes have been redesigned from common diffuser vanes by providing sharpened leading edges 62 which are disposed in close proximity to the flattened upper surface of the pump impeller 40 to give it the action of a meat grinder.

Moreover, the invention includes additional comminuting means located at this region where gross food objects are compelled to pass at high velocity through these small spaces 59, and preferably, but not necessarily, this comminuting means comprises a plurality of thin metallic cutting members or blades arranged concentrically with the axis of the diffuser. As seen in FIGS. 3 and 4 a first ring 60 and a second ring 61, each embedded within suitable slots formed in the stationary diffuser vanes on the downstream side thereof and with each ring having a cutting edge facing toward the upstream side of those vanes, may conveniently be employed. These rings are comparatively thin and since the swirling action of the liquid is substantially diminished before the liquid reaches the rings, no appreciable resistance to flow is added as a result of the rings being present. The number of cutting rings, as well as the size of the space 59 between adjacent diffuser vanes, may be widely varied without departing from the invention. Gross food objects carried against these rings at high velocity are immediately subdivided into a size sufficiently small to pass through aperture 50 in the spray arm, or into a size which, upon further erosion by the washing liquid, will pass through the orifices 50 of the spray arm 32.

Modifications of this invention will occur to those skilled in this art and it is to be understood, therefore, that this invention is not limited to the particular embodiments disclosed, but that it is intended to cover all modifications which are within the true spirit and scope of the appended claims.

What we claim as new and desire to secure by Letters Patent of the United States is:

1. In a dishwasher having a liquid spraying system, a pumping mechanism including an axial flow pump impeller and a pump housing enclosing said impeller, said housing having an annular outlet space, a spray member receiving liquid passing through said outlet space, said member having a plurality of orifices therein, a diffuser supported within said housing downstream of said pump and upstream of said spray member, said diffuser having a plurality of radially extending vanes spaced from each other and located in said annular space, and comminuting means extending between said diffuser vanes within said annular space whereby gross food objects entrained in the pumped liquid are forced into contact with said comminuting means during passage through said diffuser and are reduced to a size sufficiently small to avoid clogging of said orifices thereby.

2. In a dishwasher having a liquid spraying system, a pumping mechanism including an axial flow pump impeller and a pump housing enclosing said impeller, said housing having an annular outlet space and said impeller having vanes for moving liquid toward said outlet space at substantial velocities, a spray member receiving liquid passing through said outlet space, said member having a plurality of spray orifice therein, a diffuser supported within said housing downstream of said pump and upstream of said spray member, said diffuser having a plurality of vanes spaced from each other and located in said annular space, the spaces between said diffuser vanes being smaller in size than the space between said impeller vanes, and comminuting means adjacent the downstream side of said diffuser and extending across the spaces between said diffuser vanes within said annular space whereby gross food objects entrained in the pumped liquid are forced into contact with said comminuting means during passage through said smaller spaces at high velocity, and are reduced to a size sufficiently small to avoid clogging of said orifices thereby.

3. Apparatus as defined in claim 2 wherein said comminuting means includes at least one metallic ring fastened to the vanes of the diffuser and having a cutting edge facing toward the vanes of said pump impeller.

4. Apparatus as defined in claim 2 wherein the diffuser member is of hard plastic material and the vanes of the diffuser have sharpened leading edges in close proximity to the pump impeller to provide a grinding action, said comminuting means includes a plurality of metallic rings mounted concentrically in said annular space and having a cutting edge facing toward the vanes of said pump impeller.

5. In a dishwasher having a liquid spraying system, a pumping mechanism including an axial flow pump impeller having a plurality of impeller blades and a pump housing enclosing said impeller, said housing having an annular outlet space, a spray member receiving liquid passing through said outlet space, said spray member having a plurality of orifices therein, and a diffuser supported within said housing downstream of said pump and upstream of said spray member, said diffuser having a plurality of radially extending vanes spaced from each other and located in said annular space, at least some of said impeller blades having their downstream ends flattened into a surface generally perpendicular to the axis of rotation of said impeller, said diffuser vanes having sharpened leading edges in close proximity to said impeller blades thereby to provide a grinding action between said impeller blades and said diffuser vanes.

References Cited in the file of this patent

UNITED STATES PATENTS

| | | |
|---|---|---|
| 1,637,376 | Gibney | Aug. 2, 1927 |
| 1,817,328 | Weimers | Aug. 4, 1931 |
| 1,942,452 | Rodgers | Jan. 9, 1934 |
| 2,250,314 | Rocke | July 22, 1941 |

FOREIGN PATENTS

| | | |
|---|---|---|
| 584,395 | Great Britain | Jan. 14, 1947 |

UNITED STATES PATENT OFFICE
CERTIFICATE OF CORRECTION

Patent No. 3,079,094                          February 26, 1963

Bernard J. Brezosky et al.

It is hereby certified that error appears in the above numbered patent requiring correction and that the said Letters Patent should read as corrected below.

Column 2, line 42, for "(Docket 9D-4301)" read
-- Serial No. 108,006 --.

Signed and sealed this 15th day of October 1963.

(SEAL)
Attest:

ERNEST W. SWIDER
Attesting Officer

EDWIN L. REYNOLDS

Acting Commissioner of Patents